(12) United States Patent
Moskowitz et al.

(10) Patent No.: US 7,035,650 B1
(45) Date of Patent: Apr. 25, 2006

(54) SYSTEM AND METHOD FOR PROVIDING DIRECTIONS

(75) Inventors: Paul Andrew Moskowitz, Yorktown Heights, NY (US); Anthony Levas, Yorktown Heights, NY (US); Stephen J. Boies, Mahopac, NY (US); Samuel Dinkin, Austin, TX (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 09/594,102

(22) Filed: Jun. 14, 2000

(51) Int. Cl.
*H04Q 7/20* (2006.01)
(52) U.S. Cl. .............................. 455/456.5; 455/456.6; 455/456.1; 342/357.08; 342/464; 701/209; 701/210; 340/995.23; 340/985.28
(58) Field of Classification Search ................ 455/422, 455/432, 433, 440–448, 456–457; 701/200, 701/201, 211, 207, 209, 210; 342/357, 357.08, 342/464; 340/995.23, 995.28
See application file for complete search history.

(56) References Cited

U.S. PATENT DOCUMENTS

| | | | | |
|---|---|---|---|---|
| 5,712,830 A | * | 1/1998 | Ross et al. ..................... | 367/93 |
| 6,073,075 A | * | 6/2000 | Kondou et al. ............. | 701/203 |
| 6,127,945 A | * | 10/2000 | Mura-Smith ................. | 340/988 |
| 6,259,990 B1 | * | 7/2001 | Shojima et al. ............. | 701/209 |
| 6,418,372 B1 | * | 7/2002 | Hofmann .................... | 701/209 |
| 6,430,498 B1 | * | 8/2002 | Maruyama et al. ......... | 701/200 |
| 6,434,479 B1 | * | 8/2002 | Kondou et al. ............. | 701/203 |
| 6,477,378 B1 | * | 11/2002 | Halminen .................... | 455/450 |
| 6,873,850 B1 | * | 3/2005 | Dowling et al. ......... | 455/456.1 |
| 2003/0149794 A1 | * | 8/2003 | Morris et al. ............... | 709/249 |

* cited by examiner

*Primary Examiner*—Danh Cong Le
(74) *Attorney, Agent, or Firm*—Buckley, Maschoff & Talwalkai LLC; Stephen C. Kaufman (57) ABSTRACT

A method for providing directions includes receiving at a server, from at least one fixed wireless communication device, information identifying a current location of a portable communication device. The portable communication device has short range wireless communication capability. The at least one fixed wireless communication device is located within a building. The method further includes identifying a direction of movement to be communicated to the portable communication device to direct it towards a destination within the building. The method also includes transmitting the direction of movement to the portable communication device from the server via a fixed wireless communication device.

27 Claims, 6 Drawing Sheets

SYSTEM AND METHOD FOR PROVIDING DIRECTIONS

FIELD OF THE INVENTION

The present system and method relates to providing directions using wireless devices.

BACKGROUND OF THE INVENTION

A map is typically used as an aid in finding directions from point A to point B. However, most people do not carry maps with them in their daily travels because they can be cumbersome. Further, most people do not have maps detailing the internal particulars of buildings they enter.

A Global Positioning System (GPS) is a satellite system that transmits signals which, for civilian equipment, allows determination of a current location generally within an accuracy of +/−20 meters. Accordingly, GPS is ineffective for directing people within a building because its accuracy renders it ineffective for directing a person from point to point within and among levels of a building structure. GPS based systems are also inadequate in buildings because the GPS satellite signal does not penetrate buildings.

In emergencies, the problems of the above, even if they were used, are compounded by such factors as panic, the cause of the emergency and its location, and the need to move people in an orderly fashion while not interfering with the efforts of persons responding to the emergency.

Thus, there is a need for a way to assist persons in navigating within an area such as a building.

SUMMARY OF THE INVENTION

The present invention overcomes the foregoing and other problems with a system and method for directions. The present invention addresses the above problems because it can be readily updated to take into account floor plan modifications. Advantageously, the system operates independent of GPS, thereby providing operation in environments and under conditions in which satellite coverage is unavailable or is blocked by obstructions or shielding (e.g., in buildings, urban environments, next to large obstructions, etc.).

The current system and method addresses the above problems and provides valuable advantages because it enables a person equipped with a moveable or mobile wireless communication device to communicate with a server to obtain directional information on a small scale. Such devices are able to recognize and communicate with each other or with one or more computer networks and are equipped to send and receive information. For example, when a person desires to obtain directions to an "exit" in a building, a request can be made on the communication device. The request is transmitted to a server using the wireless communication device. The server has the ability to respond to the query. The answer is transmitted to the communication device. Depending on its capabilities, the mobile communication device can either display the answer, or verbalize the answer to the person.

In one embodiment of the system and method, a server receives information identifying a current location of a communication device having short range wireless capability. The server identifies a direction of movement to be communicated to the communication device to direct it towards a destination. The server then transmits the direction of movement to the communication device.

In a further embodiment of the system and method, a user inputs into a communication device a desired destination within a building from a current location within a building. The user receives information identifying a direction of movement within the building relative to its current location. The user then moves from the current location in the identified location of movement.

In another embodiment of the system and method, a server receives the location of an emergency event. The server then determines an evacuation route for relay to the mobile wireless communication device which transmits the information to the mobile wireless communication devices.

In a further embodiment a server tracks a path of movement of a mobile wireless communication device. If the mobile wireless communication device veers off-course, the server re-calculates the path. The server then transmits information to update the path for the wireless communication device.

In other embodiments a server can access a map database, pre-plotted map database, or an alternate map database. In an another embodiment of the system and method, the server receives information concerning an obstruction in the path of plotted route. The server accesses the alternate map database, and recalculates the alternate route for the mobile wireless communication device.

The above advantages and features are of representative embodiments only, and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the invention.

DETAILED DESCRIPTION

Figure 1:
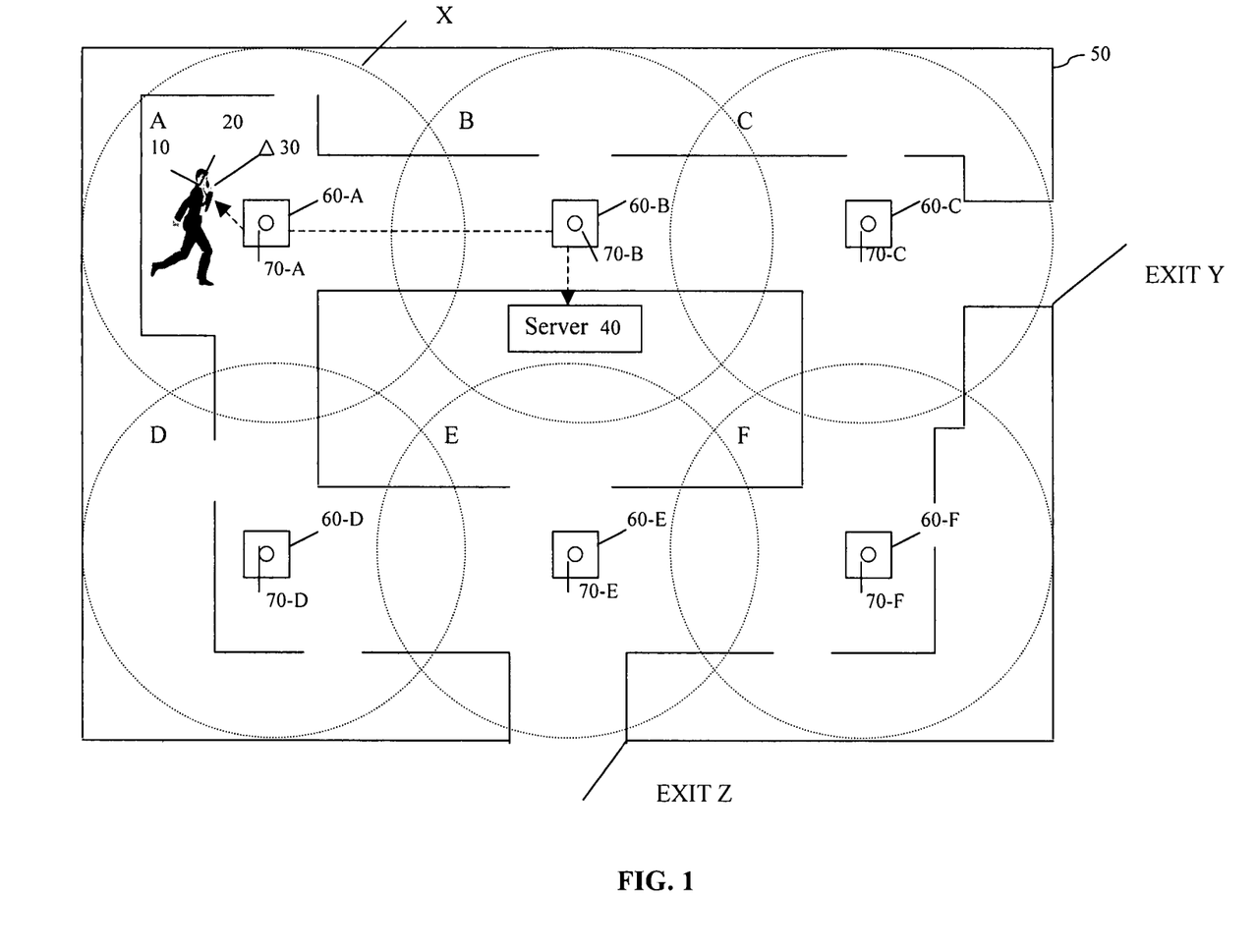
FIG. 1 illustrates a representative arrangement employing the principles of the invention.

FIG. 1 illustrates a representative arrangement employing the principles of the invention. A user 10 has a communication device 20 which can be, for example, a mobile device such as a cellular phone, a personal digital assistant (PDA), portable palm computing device, a portable or laptop computer, an automotive embedded computer, computing means or the like. The mobile wireless communication device 20 is equipped with short-range wireless communication capability.

In one embodiment, the wireless technology used by the mobile wireless communication device 20 employs technology described in the "Specification of the Bluetooth System" available at www.bluetooth.com incorporated herein by reference. As shown, the Bluetooth technology is embedded in a Bluetooth chip 30 built in accordance with the specification. Bluetooth technology is a radio frequency specification for short-range, point-to-multipoint, point-to-point voice and data transfer. Software controls and identity coding built into each Bluetooth chip 30 ensures that only those units preset by their owners can communicate.

As shown, the Bluetooth technology built into the Bluetooth chip 30 operates in a globally available frequency band ensuring communication compatibility worldwide.

Bluetooth technology facilitates fast and secure-transmission of both voice and data, even when the devices are not within line of sight. Its nominal link range is from 10 centimeters to 10 meters. It may be possible to extend the range to 100 meters by increasing the transmit power if permitted.

The Bluetooth technology is designed to be fully functional even in very noisy radio environments. The technology provides very high transmission rates up to about 1 Mbps. Data are protected by advanced error correction methods, as well as encryption and authentication routines for user protection.

According to the Bluetooth specification, up to seven slave devices can be set to communicate with a master radio in one device topologically organized in a form of a piconet. Several of these piconets can be established and linked together in ad hoc scatternets to allow communication among continually flexible configurations. Generally, devices in the same piconet use priority synchronization, but other devices can enter the configuration at any time.

In other alternative embodiments, the wireless technology is built according to Infrared Data Association (IrDA) specifications, such as IrDA-Data, IrDA-Control, or the like. IrDA provides for wireless connectivity of devices that would normally use cables for connectivity. IrDA is a point-to-point, narrow angle (30 degree cone), ad-hoc data transmission standard designed to operate over a distance of 0 to 1 meter and at speeds of 9600 bps to 16 Mbps. The short-range, narrow angle of IrDA allows the user's device to communicate with another device, in a point-and-shoot style within the range and cone coverage. The Infrared Data Association (IrDA) specifications, and standards are available at www.irda.org are incorporated herein by reference.

Figure 3:
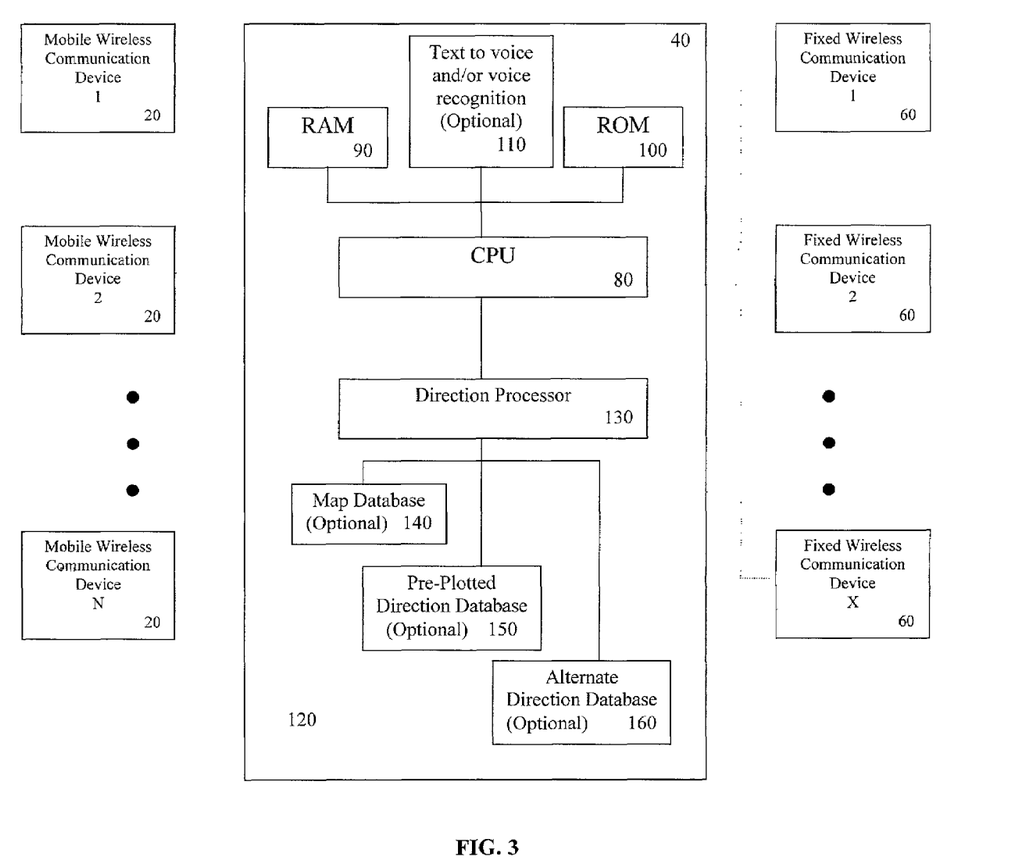
FIG. 3 illustrates a sample embodiment of the server.

FIG. 3 shows one variant in which there is a server 40, a moveable or mobile wireless communication device 20, and a fixed wireless communication device 60. The server 40 includes a central processing unit (CPU) 80, random access memory (RAM) 90, read-only memory (ROM) 100, conventional text to voice and/or voice recognition capability 110, and a large capacity storage device 120. As shown the server 40 stores information received from mobile wireless devices 20 or fixed wireless communication devices 60 in the large capacity storage device 120. This information, is used to calculate various directions, as will be described in more detail below.

The central processing unit (CPU) 80 executes program code stored in one or more of RAM 90, ROM 100 and large capacity storage device 120 in a conventional manner to carry out functions and acts described herein. CPU 80 preferably has at least one processor or microprocessor adequate to execute program modules for calculating directions.

Large capacity storage device 120 stores one or more of a map database 140, pre-plotted direction database 150, or alternate direction database 160. Further, a separate storage medium (such as a CD-ROM) may be utilized to store map image data and from which it can be read.

A direction processor 130 which is either a separate processor or part of the CPU 80 and maintains and accesses data stored in the map database 140, the pre-plotted direction database 150, the alternate direction database 160 and in some variants calculates directions based on the data in one or more of these databases. The server 40 calculates paths between points and can, in some cases, recalculate the path so that a device moving between a point A and a point B can have its route recalculated before point B is reached.

The map database 140 includes data from which a route between an origin and a destination can be calculated. The map database 140, also may contain information about the internal particulars of a building, or a geographically discrete area. Although the above listed information can be wholly within in an electronic map, it is possible to create an electronic map with only a subset of the above listed information or with other information. The present invention can access the entire map database, other networks, or any suitable subset of information to provide directions.

The pre-plotted direction database 150 is a database containing pre-plotted navigational paths between points within a structure or geographically discrete area.

Alternate direction database 160 is a database usable to adaptively calculate a route between an origin and a destination using, for example, collision avoidance techniques.

In another variant the server 40 is connected to multiple sensors. The sensors are utilized for sensing an emergency by detecting certain events exceeding a predetermined threshold and can transmit an emergency signal to the server 40. The sensors can be positioned throughout a building or geographically discrete location, and may be implemented so they are reconfigurable. For example, the sensors can be positioned in hallways, ventilation systems, or part of a fire detection system.

Fixed wireless communication devices 60 that communicate with moveable or mobile wireless communication devices 20 and the server 40, can be positioned throughout the building or geographically discrete location. The fixed wireless communication devices 60 can be equipped with Bluetooth and/or Infrared Data Association (IrDA) technology to allow information to be transmitted to their desired location. For example, the fixed wireless communication devices 60 can log all the Bluetooth baseband packets that are transmitted and received within a Bluetooth piconet. The placement of the fixed wireless communication devices 60 define the Bluetooth region, according to the Bluetooth standard, so that Bluetooth equipped devices within this region can be located by the server 40 and receive location specific information.

Advantageously, although locationally fixed at any given point in time, the fixed wireless communication devices 60 are reconfigurable. For example, the fixed wireless communication devices 60 can be positioned in hallways, built into reconfigurable cubicle walls, positioned on desktops or integrated into existing hardware such as a computer such that they can be readily or inherently reconfigured when or if the floorplan changes. Depending on the capabilities of the fixed wireless communication devices 60 they can receive or display information in voice, text or graphical forms. This information is transmitted to the server 40 or a network 170.

The Bluetooth regions defined by the fixed wireless communications devices 60 can be mixed and matched with infrared grids, motion detectors or sonic grids, for example, to identify the location of or communicate using DTMF tones with users in a building. Additionally, in some variants, cell phone networks can be utilized to augment the system and identify or communicate with users when they enter or are within a building to assist the server 40 or a network 170 in identifying the location of users 10 in the building. These other methods of detection can be employed, for example, in areas where Bluetooth regions do not overlap.

In other variants, an orientation device such as a directional antenna, can be mounted or inserted into the moveable or mobile wireless communication device 20 to identify to the server 40 the direction in which a user 10 is holding his mobile wireless communication device 20. The orientation device can alternatively be a separate physical unit. For example, a patch antenna of a few square inches the size of a credit card could be used and incorporated into an employee or visitor identification badge. Identification badges such as the XyLoc Key Card developed by Ensure Technologies can be utilized for this purpose. In this variant, the server 40 will be able to identify the direction the antenna is pointed and thus presume the orientation of the user. This enables mobile wireless communication devices 20 to receive directions in graphical form such as an arrow pointing in a specific direction.

Alternatively, an orientation device such as a magnetic compass can be incorporated into the mobile wireless communication device 20. This "low tech" variant nevertheless enables the user 10 to know which direction he is facing. Thus, the server 40 could tell the user to move "north," or "south" depending on the user's 10 location.

Referring back to the arrangement of FIG. 1, a user 10 equipped with a mobile wireless communication device 20 can communicate with a server 40 via a fixed (i.e. non-mobile) wireless communication device 60. The user's mobile wireless communication device 20 operates according to the Bluetooth specification, for example, using a Bluetooth chip 30. The user 10 is in a building 50 that has multiple fixed communication devices 60 each containing a Bluetooth chip 70 so as to define a Bluetooth region, representatively shown as dashed sphere X. When the user 10 has a question regarding directions to a location within the building 50, the user 10 activates the directional feature of the mobile wireless communication device 20. Depending on the capability of the mobile wireless communication device 20, he or she can input the questions either by typing a question, or by data entry through graphics or written words. Alternatively, the request can be made using the spoken word if the mobile wireless communication device 20 is equipped with voice recognition capabilities. For example, the user 10 can ask, "Where is the nearest exit?" The question is converted to data and transmitted by the Bluetooth chip 30 in the mobile wireless communication device 20 to the Bluetooth chip 70 in the fixed communication device 60. The fixed communication device 60 acts as an interface device connected to a server 40. In another variant of the invention the request can be transmitted directly to the server 40. When the question is received by the server 40, it accesses the map database 140, employs the data received from the user 10, and calculates the route between an origin and destination based on the users 10 location. The server 40, transmits the answer to the Bluetooth chip 70 of the fixed communication device 60 which in turn transmits the information to the Bluetooth chip 30 in the mobile wireless communication device 20. For example, in FIG. 1, to get to Exit Y the answer provided by the server can include instructions to proceed from region A, to region B, to region C, and to Exit Y. Depending on its capabilities, the mobile wireless communication device 20 provides the answer to the user 10 in either text, graphics or voice. For example, it can display an arrow, the words "proceed forward," or say the words "go down the hallway."

Figure 2:
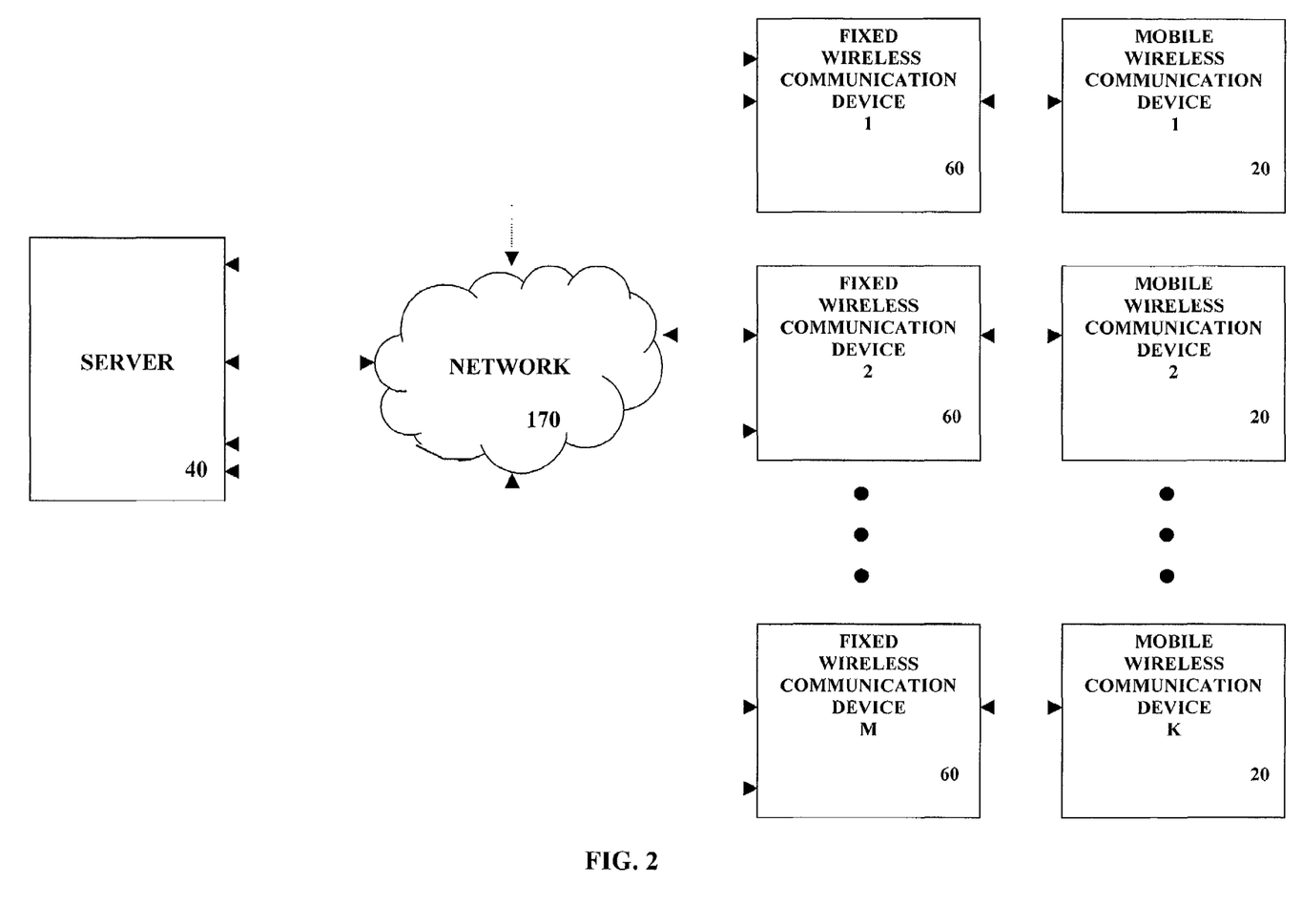
FIG. 2 illustrates an alternative system incorporating the invention.

Referring now to FIG. 2, which shows an alternative system incorporating the invention. In this arrangement, the fixed communication device 60 acts as an interface to a network 170, although the fixed communication device 60 can be connected directly to a network 170. The network 170 can, in turn, also be connected to a server 40. When a query is received by the Bluetooth chip 70 in the fixed communication device 60, the server 40, either alone, or as connected to the computer network 170, processes the query and prepares an answer. The server 40 transmits the answer to the Bluetooth chip 70 of the fixed communication device 60 which in turn transmits the information to the Bluetooth chip 30 in the mobile wireless communication device 20.

In another variant, the server 40 tracks the movement of the mobile wireless communication device 20 by receiving locational data and storing it. Therefore, when a user 10 possessing a mobile wireless communication device 20 leaves the planned route, a new route from the user's present location to the original identified location can be recalculated. For example, with respect to FIG. 1, assume the user 10 was provided with a previously computed route of A to B to C to Exit Y, which represents travel from region A, to region B, to region C, to Exit Y. Assume the user 10 deviates from the path by traveling from region A to region D rather than traveling from region A to region B. The user 10 may have done this by mistake, due to a blockage such as a fire or obstruction, or the user 10 may have decided to ignore the directions. Upon arrival at region D, the server 40 recalculates the user's 10 path to the destination, and transmits the directions to the user 10.

Figure 4:
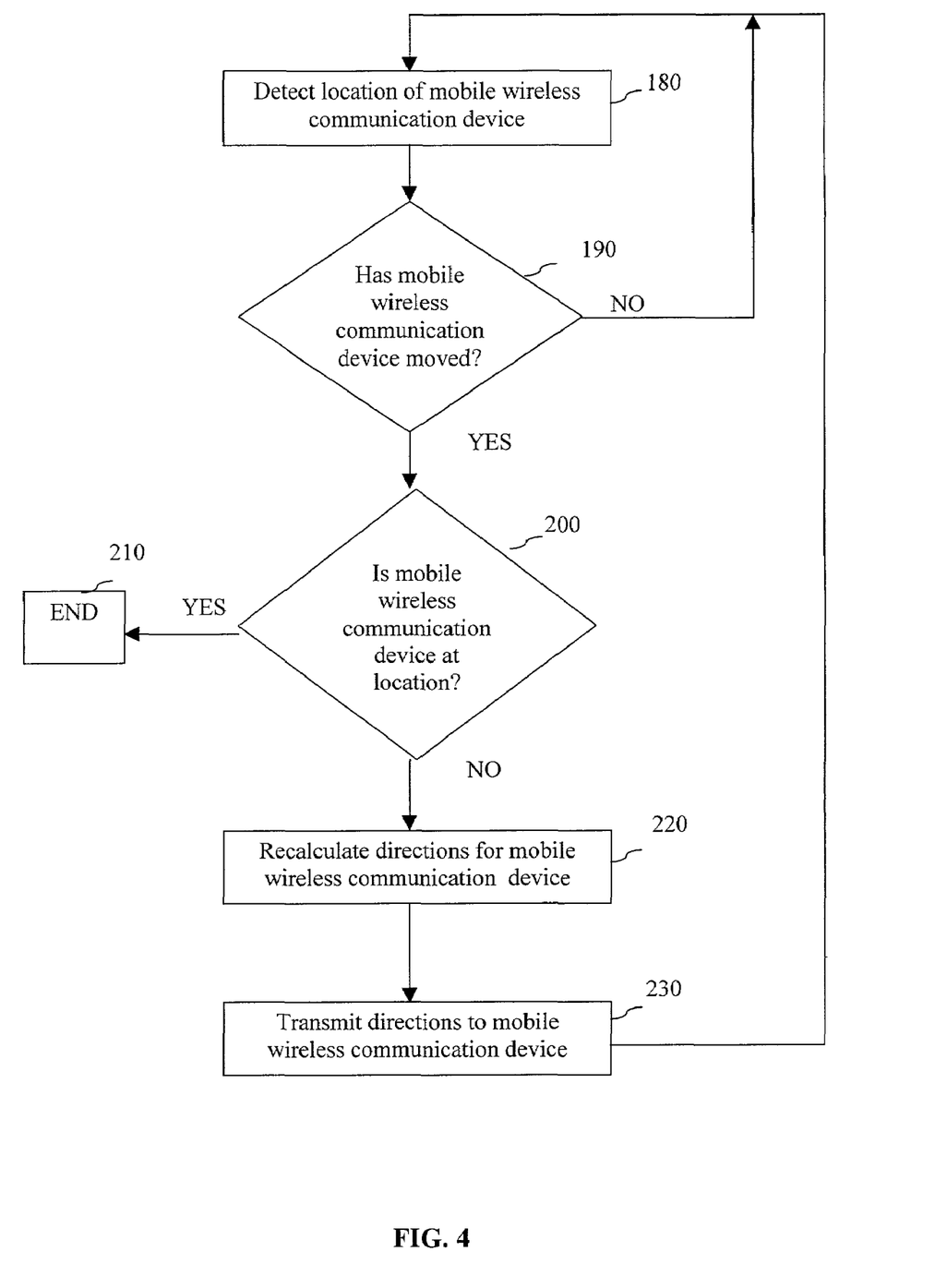
FIG. 4 is a flow chart illustrating the process of tracking and recalculating of a path.

FIG. 4 is a flow chart describing the tracking and recalculating of a path, for example, in the arrangement of FIG. 1 or 2. When a mobile wireless communication device 20 enters a region the server 40 detects the current location of the mobile wireless communication device 20 (step 180). Thereafter, movement to a new region causes a tracking system update. If the server 40 is directing the user 10 of the mobile wireless communication device 20 between two points, the server 40 continues to monitor progress of a user 10 with a mobile wireless communication device 20 from region to region (step 190). If the mobile wireless communication device 20 enters one region when the mobile wireless communication device 20 was supposed to enter a different region the server 40 will determine the mobile wireless communication device 20 is off-track (step 200). The server 40 accomplishes this by comparing the direction communication sent to the user 10 with the current location of the user 10. If the mobile wireless communication device 20 is not off-track the server 40 will not transmit new directions to the user 10 (step 210). If the user 10 with the mobile wireless communication device 20 is off-track, the server 40 will calculate a new updated route for the mobile wireless communication device 20 based upon its current position (step 220). The server 40 then transmits the updated information to the mobile wireless communication device 20 (step 230).

In another variant, the server 40 transmits information to the mobile wireless communication device 20 concerning its location in a region. The server 40 transmits updated information to the mobile wireless communication device 20 based on its location within a region. For example, in FIG.

1, when the mobile wireless communication device 20 enters region B after receiving directions to proceed to it from region A, the server 40 transmits updated information to the mobile wireless communication device 20. Thus, the information is updated relative to the user's current position.

Figure 5:
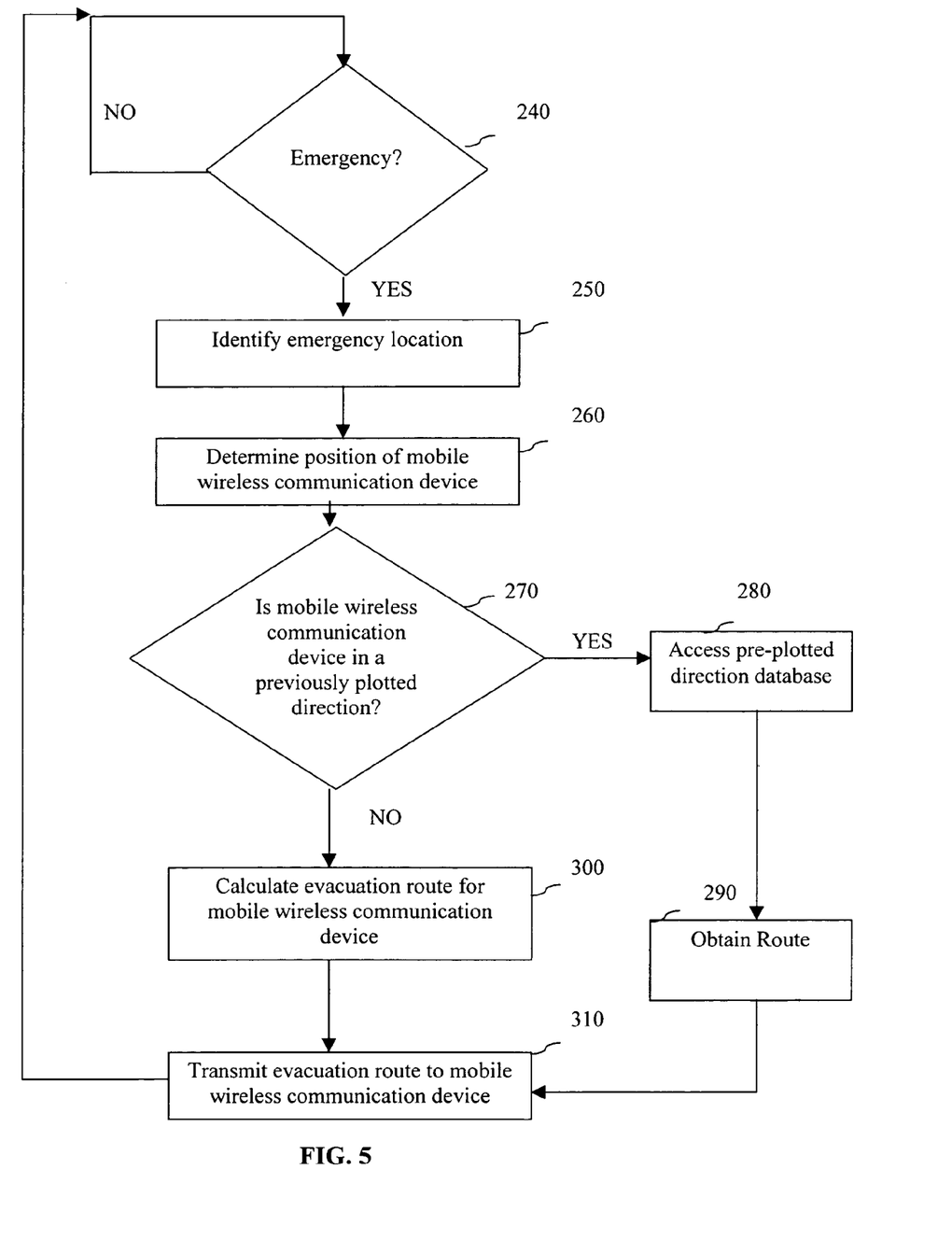
FIG. 5 is a flow chart illustrating the process of informing communication devices of an emergency.

FIG. 5 is a flow chart for informing communication devices of an emergency. The server 40 receives the location of an emergency event, for example, from one or more external sensors (step 240). The server 40 identifies the location of the event and stores it in the RAM 90 (step 250). The server 40 also determines the position of mobile wireless communication devices 20 in the building 50 by receiving location data from fixed communication devices 60 (step 260). The server 40 determines if the mobile wireless communication devices 20 are in a previously plotted direction (step 270). If the mobile wireless communication devices 20 are in a previously plotted direction, the server 40 accesses the pre-plotted direction database 150 which contains pre-programmed paths to locations throughout an area (step 280). If the server 40 accesses the pre-plotted direction database 150, it employs the data received from the fixed communication devices 60 and compares it to the location of the event stored in RAM 90 to calculate an evacuation route (step 290). The server 40 then transmits the evacuation route to the mobile wireless communication devices 20 (step 310). If the mobile wireless communication devices 20 are not in a previously plotted direction, the server 40 will access the map database 140 and calculate the evacuation route for the mobile wireless communication devices 20 (step 300). The server 40 transmits the evacuation route information to the mobile wireless communication devices 20 via a computer network 170 or directly (step 310).

Figure 6:
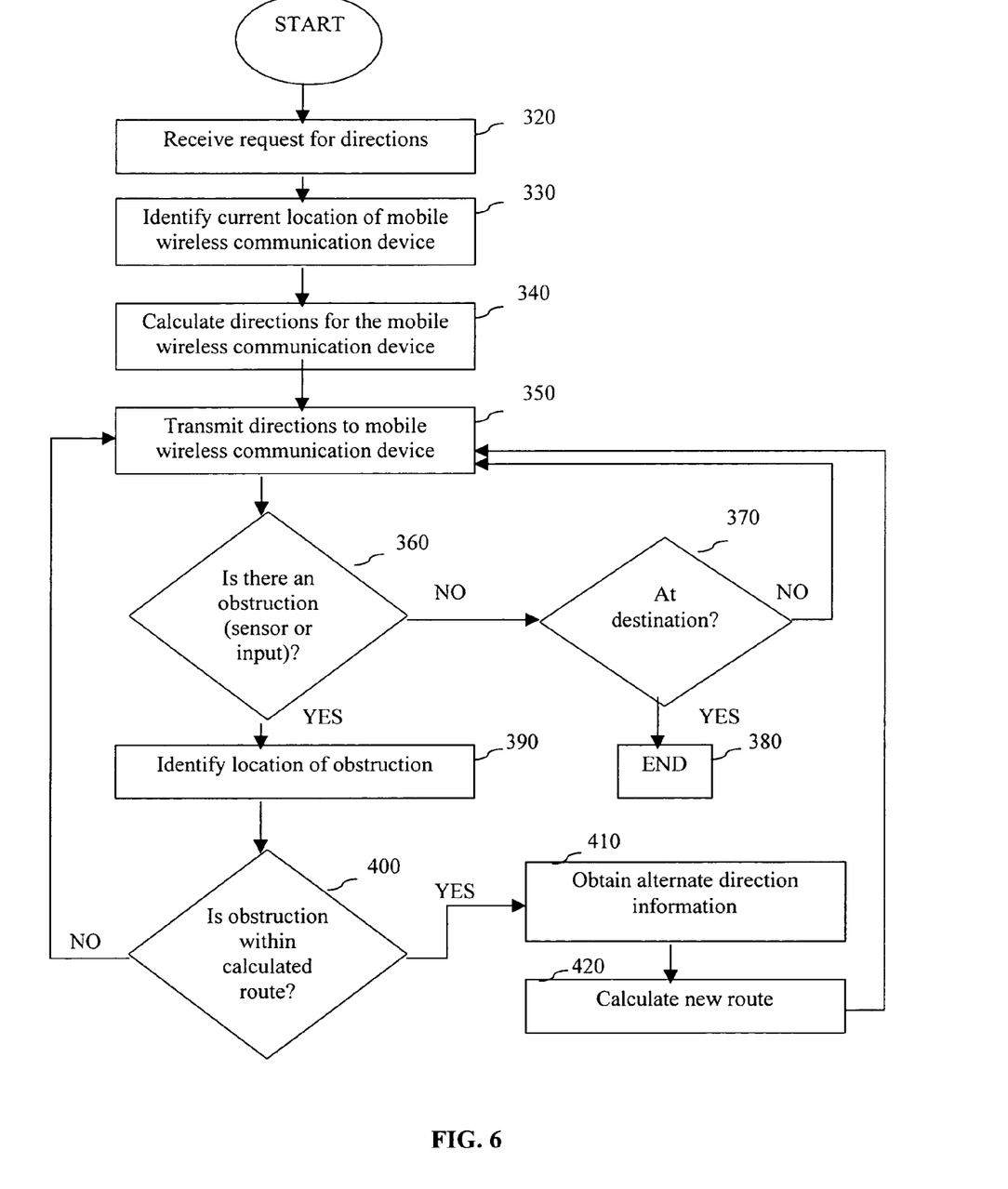
FIG. 6 is a flow chart illustrating the process of recalculating a path due to a obstruction.

FIG. 6 is a flow chart for accessing the alternate direction database 160 when an obstruction is located within a previously plotted evacuation route. The server 40 receives a request for directions from a user 10 with a mobile wireless communication device 20 (step 320). The server 40 identifies the current location of the user 10 (step 330). The server 40 calculates directions for the user 10 (step 340). The server 40 transmits the directions to the mobile wireless communication device 20 held by the user 10 (step 350). The server 40 may receive information identifying the location of an obstruction from one or more external sensors or the mobile wireless communication device 20 (step 360). For example, the user 10 could transmit data to the server 40 noting that a hallway is not passable or one or more of the sensors could do so. If there is no obstruction the server 40 determines if the user 10 is at their destination (step 370). If the user 10 is at their destination the sequence ends (step 380). However, if the user 10 is not at their destination the server 40 may transmit directions to the user 10 informing it of the obstruction (step 350). The server 40 identifies the location of the obstruction (step 390). The server 40 then compares the information regarding the obstruction to the previously plotted route for a user 10 (step 400). If the obstruction is not within the previously plotted route the server 40 will transmit the evacuation route to the mobile wireless communication device 20 held by the user 10 (step 350). If the obstruction is within the emergency route the server 40 accesses an alternate direction database 160 (step 410). The server 40 employs the data received concerning the obstruction, and the location of the user 10, to calculate a new evacuation route (step 420). The server 40 transmits the information to the mobile wireless communication device 20 held by the user 10 (step 350).

In yet another variant, the server 40 calculates directions so as to avoid creating, or to reduce, people flow problems. In this variant, the server 40 has the ability to determine multiple routes for multiple mobile wireless communication devices 20. The server 40 plots out the route for each of the mobile wireless communication devices 20 and compares them. If more than a specified number of mobile wireless communication devices 20 will converge in a region, some of the routes are recalculated as if the region had an obstruction and the routes are compared again. The process repeats at prescribed intervals, for example, when one or more mobile wireless communication devices 20 crosses from one region into another, or according to some other parameter. Advantageously, this can prevent too many mobile wireless communication devices 20 from unnecessarily proceeding to the same location at the same time during an emergency event.

The server 40 is also capable of determining if a user 10 has left a region but has not entered another region such that the user is in a "dead zone." Upon reentry into a region the server 40 will update and retransmit directions to the user 10 based on his reentry location.

Advantageously, in some variants, the regions can be defined so that they overlap. This enables the server 40 to determine the location of a user 10 with greater precision than can be done with non-overlapping regions. If the user 10 is in the overlap region the server 40 will receive data from both regions whereas, if the user 10 is not in the overlap region, data will only be received from one region. As a result, the server 40 can provide more precise directions to a user.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. It can be appreciated that many of those undescribed embodiments are within the literal scope of the following claims, and others are equivalent.

What is claimed is:

1. A method for providing directions, comprising:
   receiving at a server from at least one fixed wireless communication device information identifying a current location of a portable communication device having short range wireless communication capability, the at least one fixed wireless communication device located within a building;
   identifying a direction of movement to be communicated to the portable communication device to direct it towards a destination within the building; and
   transmitting the direction of movement to the portable communication device from the server via a fixed wireless communication device.

2. The method of claim 1, wherein the transmitting is in accordance with one of a Bluetooth specification and an Infrared Data Association (IRDA) specification.

3. The method of claim 1, wherein the transmitting uses a short-range high-frequency radio signal.

4. The method of claim 1, further comprising:
   defining multiple regions within which a direction of movement of the portable communication device can be detected.

5. The method of claim 1, further comprising:
   defining a piconet using multiple transceivers.

6. The method of claim 1, wherein the portable communication device is one of a cellular phone, a personal digital assistant, or a portable computer.

7. The method of claim 1, further comprising:
accessing a map database.

8. The method of claim 1, further comprising:
accessing a pre-plotted direction database.

9. The method of claim 1, further comprising:
accessing an alternate direction database.

10. The method of claim 9, wherein accessing the alternate direction database is a result of an obstruction.

11. The method of claim 1, further comprising:
receiving an identification of a location of one of an emergency event and an obstruction.

12. The method of claim 11, wherein the receiving the identification includes receiving a signal from one of a multiple of sensors.

13. The method of claim 11, wherein the receiving the identification includes receiving a signal from a network.

14. The method of claim 1, further comprising:
tracking the direction of movement of the portable communication device relative to the destination.

15. The method of claim 14, further comprising:
recording tracking information representing the movement of the portable communication device relative to the destination.

16. The method of claim 14, further comprising:
determining whether a movement of the portable communication device is towards the destination.

17. The method of claim 16, wherein, when the movement is not towards the destination, the method includes providing new directions.

18. The method of claim 1, further comprising:
receiving information requesting an alternate route.

19. The method of claim 18, further comprising:
determining an alternate route for the portable communication device based on a current location.

20. The method of claim 18, further comprising:
determining an alternate route based upon an intended destination.

21. The method of claim 1, further comprising:
receiving adaptive route calculation information.

22. The method of claim 21, further comprising:
determining the alternate route using the adaptive route calculation information so as to account for an amount of people flow towards the destination.

23. An apparatus for providing directions, comprising:
a memory;
a program stored in the memory;
a processor in communication with the memory, and configured to execute the stored program such that the apparatus:
receives information identifying a current location of a portable communication device having short range wireless communication capability;
identifies a direction of movement to be communicated to the portable communication device to direct it towards a destination; and
transmits the direction of movement to the portable communication device; and
a piconet in communication with the processor, the piconet including multiple transceivers.

24. The apparatus of claim 23, wherein the device conforms with one of a Bluetooth specification and an Infrared Data Association (IRDA) specification.

25. An apparatus for providing directions, comprising:
a memory;
a program stored in the memory;
a processor in communication with the memory, and configured to execute the stored program such that the apparatus:
receives information identifying a current location of a portable communication device having short range wireless communication capability;
identifies a direction of movement to be communicated to the portable communication device to direct it towards a destination; and
transmits the direction of movement to the portable communication device; and
a scatternet in communication with the processor.

26. The apparatus of claim 23, wherein the portable communication device is one of a cellular phone, a personal digital assistant, or a portable computer.

27. A method for providing directions, comprising:
determining a current location of a portable communication device based on presence of the portable communication device within a reception range of a fixed wireless communication transceiver;
receiving information identifying the current location of the portable communication device;
identifying a direction of movement to be communicated to the portable communication device to direct it towards a destination; and
transmitting the direction of movement to the portable communication device;
wherein the fixed wireless communication device is located within a building and the destination is within the building.

* * * * *